(12) United States Patent
Xu et al.

(10) Patent No.: US 10,482,653 B1
(45) Date of Patent: Nov. 19, 2019

(54) SYSTEM FOR ACTIVE-FOCUS PREDICTION IN 360 VIDEO

(71) Applicant: AT&T Intellectual Property I, L.P., Atlanta, GA (US)

(72) Inventors: Tan Xu, Bridgewater, NJ (US); Eric Zavesky, Austin, TX (US); Behzad Shahraray, Holmdel, NJ (US); David Crawford Gibbon, Lincroft, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/985,890

(22) Filed: May 22, 2018

(51) Int. Cl.
| | | |
|---|---|---|
| G06T 15/20 | (2011.01) | |
| G06F 3/01 | (2006.01) | |
| H04N 21/218 | (2011.01) | |
| H04N 21/2343 | (2011.01) | |
| H04N 21/234 | (2011.01) | |

(52) U.S. Cl.
CPC .............. *G06T 15/20* (2013.01); *G06F 3/013* (2013.01); *H04N 21/21805* (2013.01); *H04N 21/23406* (2013.01); *H04N 21/234345* (2013.01)

(58) Field of Classification Search
CPC ... G06T 15/20; G06F 3/013; H04N 21/21805; H04N 21/23406; H04N 23/234345
USPC ................................................. 345/418, 419
See application file for complete search history.

(56) References Cited

U.S. PATENT DOCUMENTS

| | | |
|---|---|---|
| 7,224,382 B2 | 5/2007 | Baker |
| 8,462,010 B2 | 6/2013 | Chi et al. |
| 8,471,783 B2 | 6/2013 | Rhodes et al. |
| 8,542,232 B2 | 9/2013 | Sauriol et al. |
| 8,584,044 B2 | 11/2013 | Wong |
| 8,760,566 B2 | 6/2014 | Pitts et al. |
| 9,363,569 B1 | 6/2016 | Christensen et al. |

(Continued)

FOREIGN PATENT DOCUMENTS

| | | |
|---|---|---|
| EP | 3155560 A1 | 4/2017 |
| WO | 2017036953 A1 | 3/2017 |

(Continued)

OTHER PUBLICATIONS

Argyriou, L. et al., "Engaging immersive video consumers: Challenges regarding 360-degree gamified video applications", Westminster-Research http://www.westminster.ac.uk/westminsterresearch, 2016, 10 pages.

(Continued)

*Primary Examiner* — Jacinta M Crawford
(74) *Attorney, Agent, or Firm* — Guntin & Gust, PLC; Ralph Trementozzi

(57) ABSTRACT

Aspects of the subject disclosure may include, for example, obtaining media content; analyzing the media content to discern a point of interest in the media content, wherein the analyzing may include scoring each of the point of interest in the media content; receiving a request from equipment of a user to view the media content; obtaining information about the user; identifying a predicted field of view of the user based on the information about the user and the analysis; sending the predicted field of view to the user; monitoring a line of sight of the user; and updating the analysis and the predicted field of view of the user based on the line of sight of the user. Other embodiments are disclosed.

20 Claims, 7 Drawing Sheets

(56) References Cited

U.S. PATENT DOCUMENTS

| | | |
|---|---|---|
| 9,429,752 B2 | 8/2016 | Schowengerdt et al. |
| 9,686,520 B2 | 6/2017 | Degtyarev et al. |
| 9,690,099 B2 | 6/2017 | Bar-Zeev et al. |
| 9,690,371 B2 | 6/2017 | Saito |
| 9,710,973 B2 | 7/2017 | Bar-Zeev et al. |
| 9,720,241 B2 | 8/2017 | Osterhout et al. |
| 9,729,850 B2 | 8/2017 | Medina et al. |
| 9,743,060 B1 | 8/2017 | Matias et al. |
| 9,774,887 B1 | 9/2017 | Walkingshaw |
| 9,782,678 B2 | 10/2017 | Liu et al. |
| 9,830,513 B2 | 11/2017 | Olsson et al. |
| 9,836,889 B2 | 12/2017 | Vaught et al. |
| 9,881,420 B2 | 1/2018 | Miller et al. |
| 9,904,055 B2 | 2/2018 | Burns et al. |
| 9,911,238 B2 | 3/2018 | Doronichev et al. |
| 9,922,462 B2 | 3/2018 | Miller |
| 9,928,655 B1 | 3/2018 | Alston |
| 2003/0220971 A1 | 11/2003 | Kressin et al. |
| 2012/0042282 A1 | 2/2012 | Wong et al. |
| 2013/0131985 A1 | 5/2013 | Weiland et al. |
| 2014/0184550 A1 | 7/2014 | Hennessey et al. |
| 2015/0049162 A1 | 2/2015 | Kurupacheril et al. |
| 2015/0302422 A1 | 10/2015 | Bryson et al. |
| 2016/0012855 A1* | 1/2016 | Krishnan ............ G11B 27/105 386/241 |
| 2016/0260196 A1 | 9/2016 | Roimela et al. |
| 2016/0317930 A1 | 11/2016 | Nakayama |
| 2016/0357255 A1 | 12/2016 | Lindh et al. |
| 2017/0026577 A1 | 1/2017 | You |
| 2017/0032575 A1 | 2/2017 | Yeoh et al. |
| 2017/0039766 A1 | 2/2017 | Passmore et al. |
| 2017/0109007 A1 | 4/2017 | Hurter |
| 2017/0115626 A1 | 4/2017 | Wei |
| 2017/0169602 A1 | 6/2017 | Blackmon et al. |
| 2017/0188058 A1* | 6/2017 | Nakashima ........ H04N 21/2387 |
| 2017/0223395 A1 | 8/2017 | Elliot et al. |
| 2017/0236162 A1 | 8/2017 | Christensen et al. |
| 2017/0280166 A1 | 9/2017 | Walkingshaw et al. |
| 2017/0285735 A1 | 10/2017 | Young et al. |
| 2017/0287112 A1 | 10/2017 | Stafford et al. |
| 2017/0287446 A1 | 10/2017 | Young et al. |
| 2017/0289219 A1 | 10/2017 | Khalid et al. |
| 2017/0293356 A1 | 10/2017 | Khaderi et al. |
| 2017/0293947 A1 | 10/2017 | Singh |
| 2017/0316806 A1 | 11/2017 | Warren et al. |
| 2017/0318283 A1* | 11/2017 | Watson ................ H04N 13/366 |
| 2017/0332064 A1 | 11/2017 | Martineau et al. |
| 2017/0339341 A1 | 11/2017 | Zhou et al. |
| 2017/0347084 A1 | 11/2017 | Boyce |
| 2017/0371518 A1 | 12/2017 | Leppanen et al. |
| 2018/0024724 A1 | 1/2018 | Patel et al. |
| 2018/0054659 A1 | 2/2018 | Goswami |
| 2018/0081178 A1 | 3/2018 | Shpunt |
| 2018/0095542 A1 | 4/2018 | Mallinson |
| 2018/0096494 A1 | 4/2018 | Zhou et al. |

FOREIGN PATENT DOCUMENTS

| | | |
|---|---|---|
| WO | 2017087641 | 5/2017 |
| WO | 2017143128 A1 | 8/2017 |
| WO | 2017143289 A1 | 8/2017 |

OTHER PUBLICATIONS

Corbillon, Xavier et al., "Optimal Set of 360-Degree Videos for Viewport-Adaptive Streaming." in Proc. of ACM Multimedia (MM) (Oct. 23-27, 2017)., pp. 1-9.

Engestrom, Ulla, "Interactive 360 Degree Videos: A Demo for a New User Interface", http://blog.thinglink.com/marketing/interactive-360-degree-video, ThingLink—Bringing a New Dimension to the Visual Web, Oct. 9, 2015, 6 pages.

Facebook, "Facebook Now Lets You Guide Viewers Around Your 360-Degree Video", http://www.digitaltrends.com/social-media/facebook-360-video-tools-analytics/, 5 pages.

Grogorick, Steve et al., "Subtle Gaze Guidance for Immersive Environments", Proceedings of the ACM Symposium on Applied Perception, ACM 2017, Sep. 16-17, 2017, 7 pages.

Lin, Yung-Ta et al., "Outside-In: Visualizing Out-of-Sight Regions-of-Interest in a 360 Video Using Spatial Picture-in-Picture Previews", UIST 2017, Oct. 22-25, 2017, Quebec City, QC, Canada Copyright c 2017 Association for Computing Machinery. ACM ISBN 978-1-4503-4981-9/17/10$15.00 https://doi.org/10.1145/3126594.3126656, Oct. 2017, 11 pages.

Lisnevska, Alina , "360-Degree Video Creation—Strategies to Consider", Sep. 6, 2017, 7 pages.

Sheikh, Alia et al., "Directing Attention in 360-Degree Video", BBC Research and Development, UK, 2016, 9 pages.

Veas, Eduardo et al., "Directing Attention and Influencing Memory With Visual Saliency Modulation", Proceedings of the SIGCHI Conference on Human Factors in Computing Systems, ACM, 2011, 10 pages.

\* cited by examiner

US 10,482,653 B1

SYSTEM FOR ACTIVE-FOCUS PREDICTION IN 360 VIDEO

FIELD OF THE DISCLOSURE

The subject disclosure relates to predicting a user's focus in media content, such as 360 degree video.

BACKGROUND 360 video has been gaining in popularity. However, 360 degree video, as well as other forms of media content, consumes a large amount of bandwidth. Because it is uncommon for a user to view the entire 360 degree video, much of the bandwidth is wasted.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for predicting what portions of media content a user will actually consume, and providing the predicted portion rather that the entire media content. By monitoring what the user actually looks at, the system can learn about the users and/or better predict the user's field of view. Other embodiments are described in the subject disclosure.

One or more aspects of the subject disclosure include a method comprising obtaining and analyzing media content to discern a point of interest therein, identifying a predicted field of view of a user based on information about the user and the analysis of the media content, sending the predicted field of view to the equipment of the user, monitoring a line of sight of the user, and updating the analysis and the predicted field of view of the user based on the line of sight of the user.

One or more aspects of the subject disclosure include machine-readable instructions that, facilitate performance of operations comprising receiving video content from a 360 degree camera, analyzing the video content to identify at least one potential point of interest, identifying a predicted field of view based on information about one or more users and the analysis, sending the predicted field of view to the user(s), monitoring a line of sight of the user(s), and updating the analysis the predicted field of view based on the line of sight.

One or more aspects of the subject disclosure include an apparatus comprising a processor; and a memory that stores instructions that, facilitate performance of receiving video content from a 360 degree camera, analyzing the video content to identify at least one potential point of interest, identifying a predicted field of view based on information about a user and the analysis sending less than 180 degrees of the video content centered on the predicted field of view to the user, monitoring the user's line of sight based on eye movements, and updating the analysis and the predicted field of view based on the line of sight.

Figure 1:
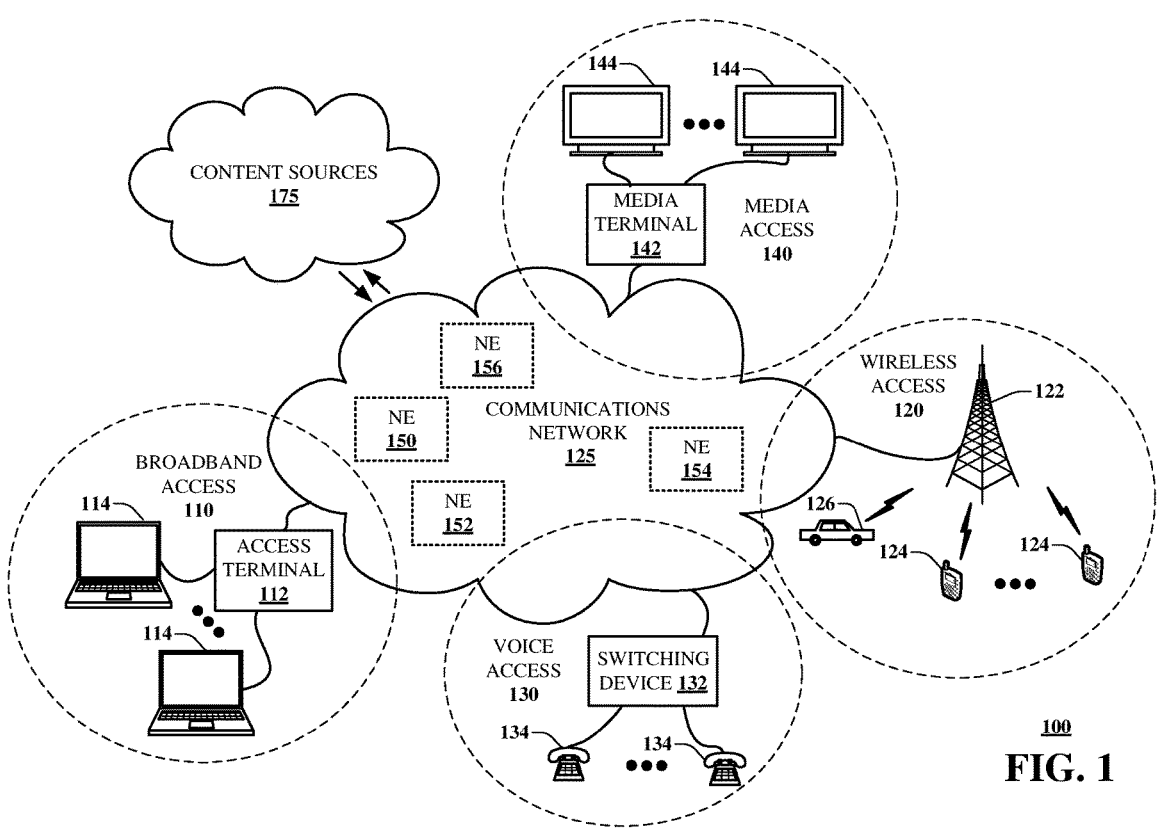
FIG. 1 is a block diagram illustrating an example, non-limiting embodiment of a communications network in accordance with various aspects described herein.

Referring now to FIG. 1, a block diagram is shown illustrating an example, non-limiting embodiment of a communications network 100 in accordance with various aspects described herein. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on). The communications network 125 may be a component of a focus prediction service, as will be discussed in greater detail below, or may merely facilitate communications between the focus prediction service and user devices, such as the data terminal 114, the mobile device 124, and/or other devices which will be discussed in greater detail below.

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
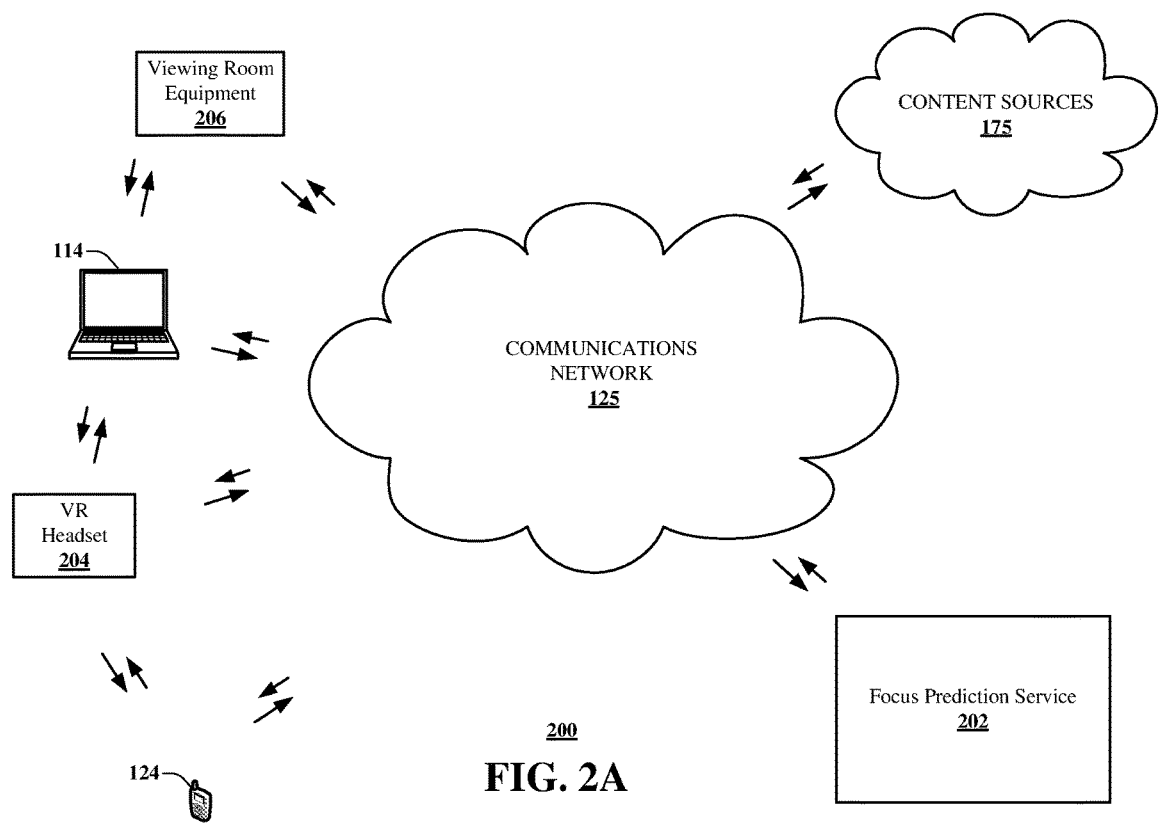
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communication network of FIG. 1 in accordance with various aspects described herein. A focus prediction service (FPS) 202 of the disclosed embodiments obtains media content, such as from the content source 175 through the communications network 125. The FPS 202 analyzes the content in an attempt to predict where users may look within the content. When user(s) request the content, the FPS 202 may identify a predicted field of view of the user(s), possibly based off the analysis and/or information obtained about the user(s), as will be discussed in greater detail below. The FPS 202 may send that predicted field of view, and/or actual line(s) of sight, to the user(s) equipment, rather than the entire media content, thereby conserving bandwidth. The FPS 202 may obtain the media content before or after receiving a user request for the content. The user may interact with the FPS 202 through a variety of devices, such as the data terminal 114, the mobile device 124, Virtual Reality (VR) headset 204, Viewing Room Equipment (VRE) 206, other equipment, and/or any combination thereof. For example, the FPS 202 may communicate directly with the VR headset 204 and/or VRE 206, through the communications network 125, and/or through the data terminal 114, the mobile device 124, other equipment, and/or any combination thereof.

Figure 2B:
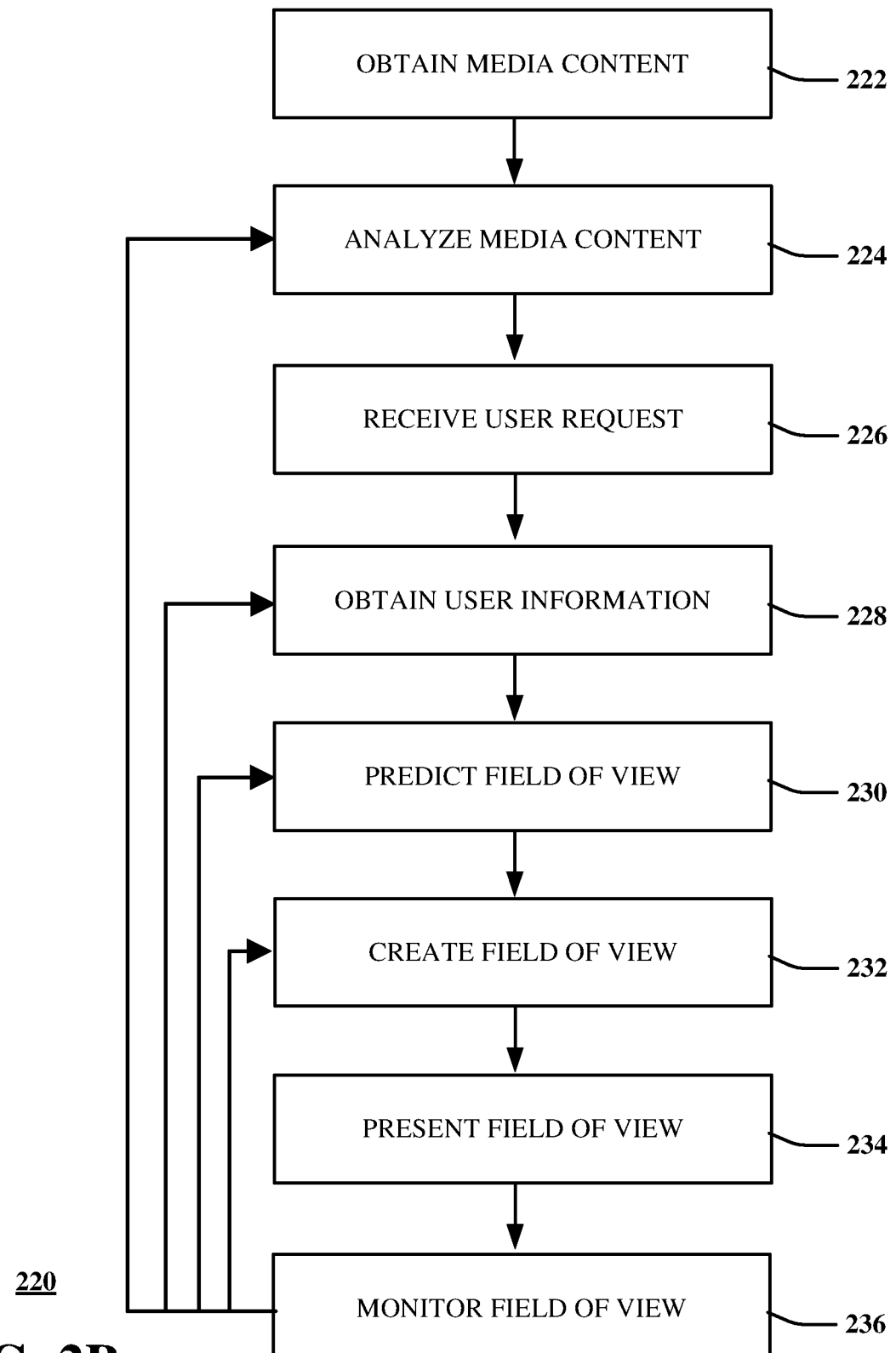
FIG. 2B depicts an illustrative embodiment of a method in accordance with various aspects described herein.

FIG. 2B depicts an illustrative embodiment of a method 220 in accordance with various aspects described herein. As shown in 222, the FPS 202 obtains media content, such as from the content source 175 through the communications network 125. The media content may be 360 degree video, three-dimensional video, other media content, and/or a combination thereof.

As shown in 224, the FPS 202 may analyze the media content to discern a plurality of points of interest in the media content. This analysis may include scoring each of the points of interest in the media content. For example, the FPS 202 may have monitored previous users' consumption of the media content, tracking their field of view and/or actual gaze, and therefore determined where those previous users looked within the media content. Thus, the scoring may comprise a tally of how often previous users have looked at a particular point of interest in the media content. In some embodiments, users may choose to opt-out of such monitoring. In some embodiments, users must opt-in in order for their consumption of the media content to be monitored in this manner.

The tally itself can be used to identify further points of interest. For example, if users frequently look at the same point, or spot, in the media content, that point may be identified as a possible point of interest. The more often previous users have looked at a particular point, the more likely it may be a point of interest for future users. Thus, not only can the tally be used in the scoring of points of interest, the tally may also be used to identify points of interest.

The FPS 202 itself may perform the analysis. In some embodiments, another element or elements perform the analysis and/or identify points of interest in the media content. For example, the content source 175 may provide the points of interest along with the media content. In any case, the identification of the points of interest may evolve as more users view the media content.

As shown in 226, the FPS 202 may receive or otherwise obtain a user request for the media content. Such a request may be received before or after the FPS 202 has obtained and/or initially analyzed the media content. For example, the FPS 202 may obtain access to the media content, but wait for a user request to actually analyze it, thereby conserving resources.

As shown in 228, the FPS 202 may also obtain information about the user. This information may include demographic information about the user, such as age, gender, etc. This information may include user preferences and/or user viewing habits.

As shown in 230, the FPS 202 may identify or otherwise predict a field of view of the user based on the information about the user(s) and the points of interest in the media content. In some embodiments, the field of view may contain points of interest that are likely to be of interest to the user, based on the analysis and information about the user. For example, in some embodiments, a field of view of previous users may be considered likely to be of interest to future users. In some embodiments, the content itself, as received from the content source 175, may contain predicted points of interest. Such origin-specified points of interest may be used as unique points to be modified or as reference points that may later be replaced or overridden by further processing and/or analysis, as described herein.

In some embodiments, the demographic information about the user may be taken into account. For example, a field of view of previous users sharing similar demographics with the user may be considered likely to be of interest to the user. Thus, the FPS 202 may account for both the initial analysis as well as specific information about the user in order to identify or otherwise predict a field of view of the user.

In some embodiments, the FPS 202 may adapt to predict points of interest for certain physical limitations and/or capabilities of a user. For example, similar to the detection of points of interest that may focus on certain actors or buildings in a scene, the FPS 202 may also identify preferences for users with low-vision, sharpness sensitivity, color blindness, or some other limitation. Such user capabilities would may be processed much like the demographic information discussed herein.

User preferences may also be used to supplement, replace, and/or override the demographic information and/or other information about the user. For example, a specific user may be interested in things similarly situated users may not be. As such, that user can override normal demographic processing. As another example, user preferences (possibly in the form of parental controls) may be used to ensure certain users are not exposed to inappropriate material. In some embodiments, user preferences may be used to specify topics or subject matter that a specific user is or is not interested in.

Similarly, a user's actual viewing habits may be used to enhance, update, or even correct the information about a user. For example, a user may specify that they are interested in a specific subject, such as in user preferences. The FPS 202, or another portion of the system, may notice over time that they tend to not pay much attention to certain points of interest highlighted due to matching that specific subject. The FPS 202 may update the information about the user, such as by refining the subject further, or applying less weight to the specific subject in determining which points of interest may be of interest to the user.

Similarly, in some cases, the FPS 202 may notice over time that a user tends to pay more attention to certain points of interest, that were not otherwise flagged as being points of interest likely to be of interest to the user. Here again, the FPS 202 may update the information about the user, such as by applying more weight to a specific subject in determining which points of interest may be of interest to the user.

As shown in 232, the FPS 202 may extract the field of view from the media content, or otherwise create the user's predicted field of view. In some embodiments, the field of view may be centered on one or more points of interest, and include up to 90 degrees around the one or more points of interest. For example, the user's predicted field of view may comprise 180 degrees (horizontally and/or vertically) centered on the one or more points of interest. In this manner, as will be discussed in greater detail below, the system need only present half, or less than half, of the media content, thereby preserving bandwidth and saving data charges.

In some embodiments, the user's predicted field of view may comprise less than 180 degrees (horizontally and/or vertically) centered on the one or more points of interest. In some embodiments, the user's predicted field of view may comprise less than 135 degrees (horizontally and/or vertically) centered on the one or more points of interest, thereby using even less bandwidth and data charges. In some embodiments, the user's predicted field of view may comprise less than 90 degrees (horizontally and/or vertically) centered on the one or more points of interest, which may require a minimum bandwidth and/or data charges.

As shown in 234, the FPS 202 then presents the predicted field of view to the user. In some embodiments, the FPS 202 may present the predicted field of view to the user's equipment or device(s). For example, the FPS 202 may present the predicted field of view to the user's VR headset 204, the data terminal 114, the mobile device 124, Viewing Room Equipment 206, other equipment, and/or any combination thereof. That device may then present the predicted field of view to the user.

As shown in 236, the FPS 202 may monitor the user's actual field of view. In some embodiments, the system monitors the position and orientation of the user's VR headset 204. In some embodiments, the system monitors an actual view through a device. For example, rather than merely monitoring the position and orientation of the user's VR headset 204, the FPS 202 may monitor the user's actual line of sight or gaze. More specifically, depending upon the hardware used, the FPS 202 may actually monitor the user's eyes and discern where the user is actually looking, rather than just where their head (or VR headset 204) is pointing. This may be done, for example, by detecting reflections from the user's eyes, or monitoring images of the user's eyes, and determining therefrom which direction the user is looking, which may be relative to (but different from) orientation of the user's VR headset 204.

By knowing where the user is actually looking, the FPS 202 may also present the portion of the media content at which the user is actually looking, i.e. their actual field of view, gaze, or line of sight, whether or not that portion corresponds to the predicted field of view. In some embodiments, the FPS 202 may also present the user's line of sight, in addition to the predicted field of view. For example, in some embodiments, the FPS 202 may present up to 180 degrees (horizontally and/or vertically) of the media content centered on the user's actual line of sight. In this case, should the user be looking directly opposite the predicted field of view, the FPS 202 may present the full 360 degrees of the media content. Or course, to the extent the predicted field of view and the user's actual line of sight overlap, the FPS 202 need not present the full 360 degrees of the media content, thereby conserving bandwidth and/or data charges.

In some embodiments, the FPS 202 may present less than 180 degrees (horizontally and/or vertically) of the media content centered on the user's actual line of sight. In some embodiments, the FPS 202 may present less than 135 degrees (horizontally and/or vertically) of the media content centered on the user's actual line of sight, thereby using less bandwidth and data charges. In some embodiments, the FPS 202 may present less than 90 degrees (horizontally and/or vertically) of the media content centered on the user's actual line of sight, thereby using even less bandwidth and data charges.

In some embodiments, the FPS 202 may determine a midpoint between the predicted field of view and the user's actual line of sight. In this case, the FPS 202 may present up to 180 degrees (horizontally and/or vertically) of the media content centered on the midpoint. In some embodiments, the FPS 202 may present less than 180 degrees (horizontally and/or vertically) of the media content centered on the midpoint. In some embodiments, the FPS 202 may present less than 135 degrees (horizontally and/or vertically) of the media content centered on the midpoint, thereby using less bandwidth and data charges. In some embodiments, the FPS 202 may present less than 90 degrees (horizontally and/or vertically) of the media content centered on the midpoint, thereby using even less bandwidth and data charges. The FPS 202 may determine how much of the media content to present based on how closely the predicted field of view and the user's actual line of sight correlate.

As shown, and discussed above, the FPS 202 knows where it predicts the user will look, i.e. the predicted field of view, for example, and where the user is actually looking, i.e. the user's actual line of sight. To the extent these two correlate, the identification of the points of interest, as well as the information about the user, may be considered accurate. Otherwise, the analysis (including the identification of the points of interest and/or scoring thereof), as well as the information about the user may be updated, enhanced, or otherwise supplemented, based on where the user is actually looking as compared to where the FPS 202 predicts the user will look.

For example, as discussed above, where users actually look may be used to further identify possible points of interest. Similarly, if users typically linger at certain points of interest, then those points may be given more weight, and/or a higher scoring, when identifying and/or scoring points of interest. On the other hand, if users typically avoid certain points of interest, then those points may be given less weight, and/or a lower scoring, when identifying and/or scoring points of interest.

All of this analysis may be done specific to the user. For example, as the user uses the system, the system may continually learn more about that user's true interests, which may then be used to improve the predicted field of view. This may also be done on the fly. For example, where the FPS 202 identifies the predicted field of view in the media content based on information then known about the user (or in the absence of such information), the FPS 202 monitors the user's actual line of sight and may more accurately identify the predicted field of view in later portions of that same media content.

The FPS 202 may perform the above processes on the same or different media content for multiple users, such that each user experience is different. For example, the FPS 202 may present the same portion of the media content to two different users, or may present different predicted fields of view to different users. The FPS 202 may do so simultaneously and/or using the same equipment. For example, where two users are utilizing the same Viewing Room Equipment 206, or terminal 114 (possibly with two separate VR headsets 204), the FPS 202 may present two different predicted fields of view to the Viewing Room Equipment 206 and/or the terminal 114, for distinct presentation through the two VR headsets 204. In some embodiments, where two users are utilizing the same Viewing Room Equipment 206, or terminal 114 (possibly with two separate VR headsets 204), the FPS 202 may present one predicted field of view to the Viewing Room Equipment 206 and/or the terminal 114, for presentation through the two VR headsets 204. In some embodiments, the FPS 202 may also present the users' actual lines of sight, to the extent they differ from the predicted field(s) of view.

In some embodiments, the FPS 202 may determine a midpoint between the users' actual lines of sight. In this case, the FPS 202 may present up to 360 degrees (horizontally and/or vertically) of the media content, where the users' actual lines of sight differ significantly. In some embodiments, the FPS 202 may present less than 180 degrees (horizontally and/or vertically) of the media content centered on the midpoint. In some embodiments, the FPS 202 may present less than 135 degrees (horizontally and/or vertically) of the media content centered on the midpoint, thereby using less bandwidth and data charges. In some embodiments, the FPS 202 may present less than 90 degrees (horizontally and/or vertically) of the media content centered on the midpoint, thereby using even less bandwidth and data charges. The FPS 202 may determine how much of the media content to present based on how closely the predicted fields of view and/or the users' actual lines of sight correlate.

In some embodiments, the FPS 202 may determine a midpoint between the predicted fields of view for the different users. In this case, the FPS 202 may present up to 360 degrees (horizontally and/or vertically) of the media content, where the predicted fields of view for the different users differ significantly. In some embodiments, the FPS 202 may present less than 180 degrees (horizontally and/or vertically) of the media content centered on the midpoint. In some embodiments, the FPS 202 may present less than 135 degrees (horizontally and/or vertically) of the media content centered on the midpoint, thereby using less bandwidth and data charges. In some embodiments, the FPS 202 may present less than 90 degrees (horizontally and/or vertically) of the media content centered on the midpoint, thereby using even less bandwidth and data charges. The FPS 202 may determine how much of the media content to present based on how closely the predicted field of view and the user's actual line of sight correlate.

In some embodiments, the FPS 202 may determine a midpoint between the predicted fields of view for the different users and the users' actual lines of sight. In this case, the FPS 202 may present up to 360 degrees (horizontally and/or vertically) of the media content, where predicted fields of view for the different users and/or the users' actual lines of sight differ significantly. In some embodiments, the FPS 202 may present less than 180 degrees (horizontally and/or vertically) of the media content centered on the midpoint. In some embodiments, the FPS 202 may present less than 135 degrees (horizontally and/or vertically) of the media content centered on the midpoint, thereby using less bandwidth and data charges. In some embodiments, the FPS 202 may present less than 90 degrees (horizontally and/or vertically) of the media content centered on the midpoint, thereby using even less bandwidth and data charges. The FPS 202 may determine how much of the media content to present based on how closely the predicted fields of view and/or the users' actual lines of sight correlate.

It will be appreciated, having read this disclosure, that the FPS 202 may obtain the media content directly, or indirectly from a 360 degree camera. For example, one of the content sources may act as a host for the 360 degree camera, storing prerecorded footage or otherwise making such media content available. In some embodiments, the FPS 202 may obtain live, or near real time, media content (directly or indirectly) from the 360 degree camera.

Some 360 degree cameras are essentially two 180 degree cameras positioned back to back, thereby providing 360 degrees of audio/video media content. In some cases, a seam between the fields of view of the two cameras is discernable. Therefore, in some embodiments, the FPS 202 may generate control signals to, or for, the camera to align it with the predicted field(s) of view, the users' actual line(s) of sight, and/or a midpoint there between.

In some embodiments, such as where the FPS 202 receives live, real-time, or near real-time content from a camera and where the FPS 202 provides 180 degrees or less of the media content to the user's equipment, for example, the camera need not be a 360 camera to effectively provide 360 degrees of audio/video media content. Specifically, most people can focus on, or effectively see, less than 180 degrees. Therefore, to actually view 360 degrees, a user must turn their head, and cannot view a full 360 degrees simultaneously. Where the FPS 202 controls the alignment/orientation of the camera, the FPS 202 can ensure that the camera is pointing in the direction the user is actually looking (since the FPS 202 can also track the user's actual field of view), thereby simulating 360 degree video with a camera that only generates 180 degrees, or less, of media content. In some embodiments, the FPS 202 simulate 360 degree video with a camera that only generates 135 degrees, or less, of media content. In some embodiments, especially where a user's focus is expected to be precise, the FPS 202 simulate 360 degree video with a camera that only generates 90 degrees, or less, of media content.

While for purposes of simplicity of explanation, the respective processes are shown and described as a series of blocks in FIG. 2B, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
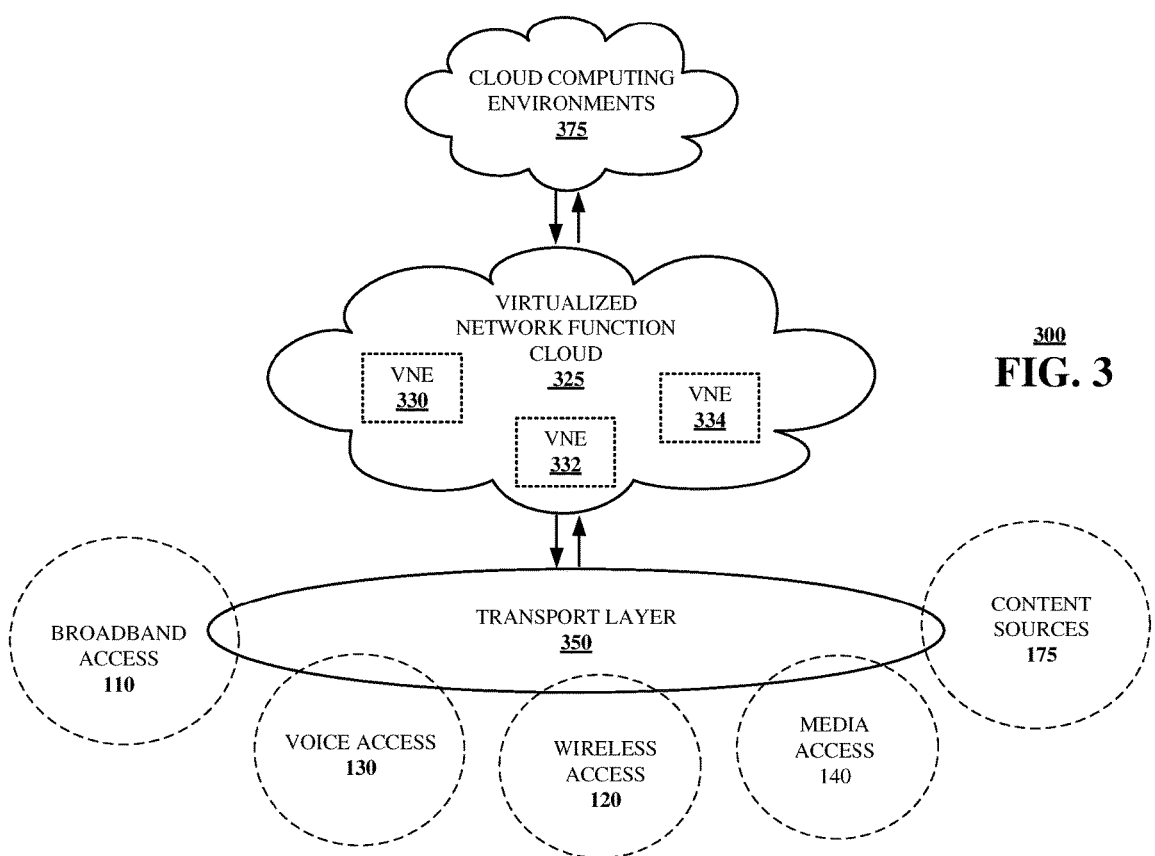
FIG. 3 is a block diagram illustrating an example, non-limiting embodiment of a virtualized communication network in accordance with various aspects described herein.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of system 200, and method 220 presented in FIGS. 1, 2A, 2B, and 3.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The VNEs 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These VNEs 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
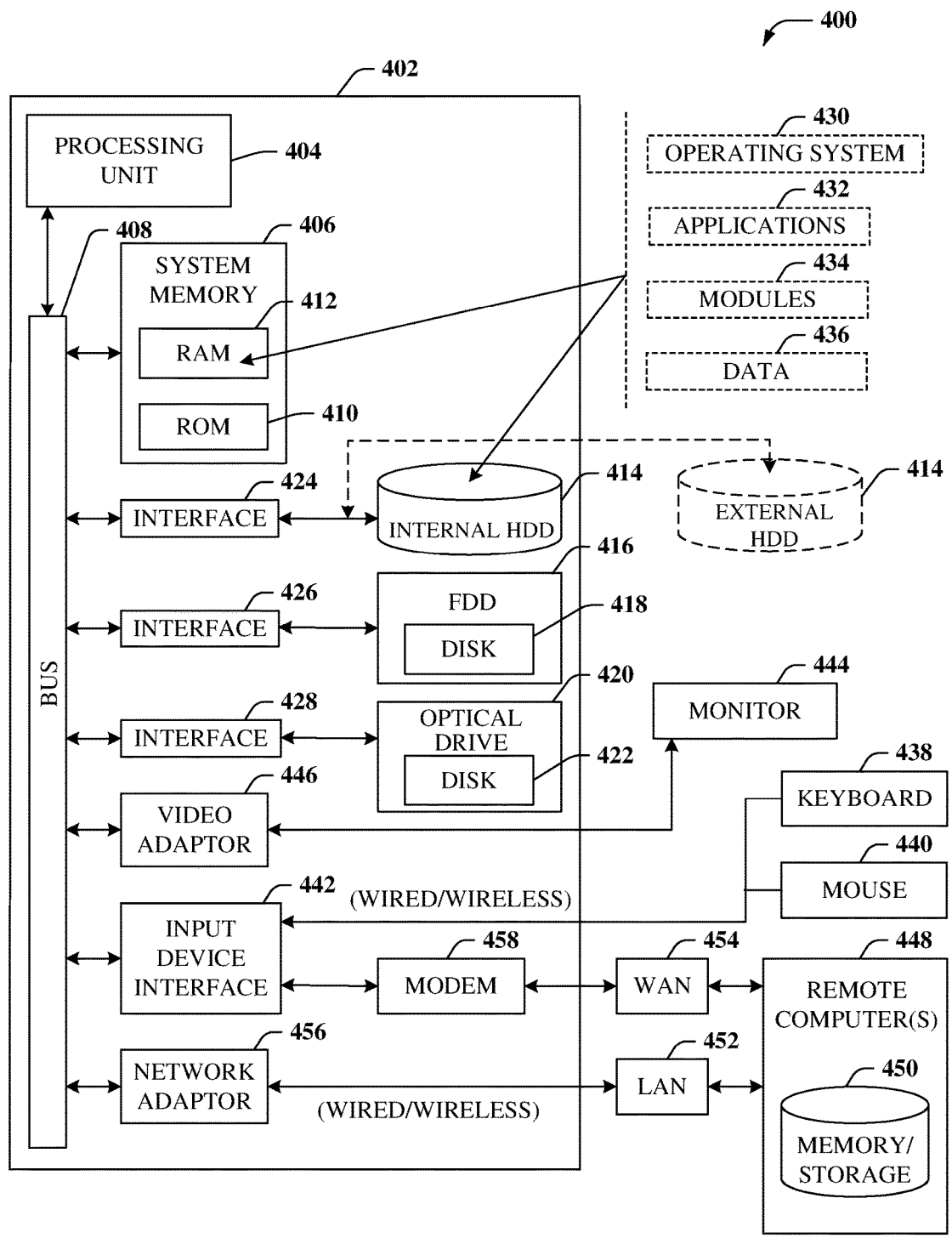
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
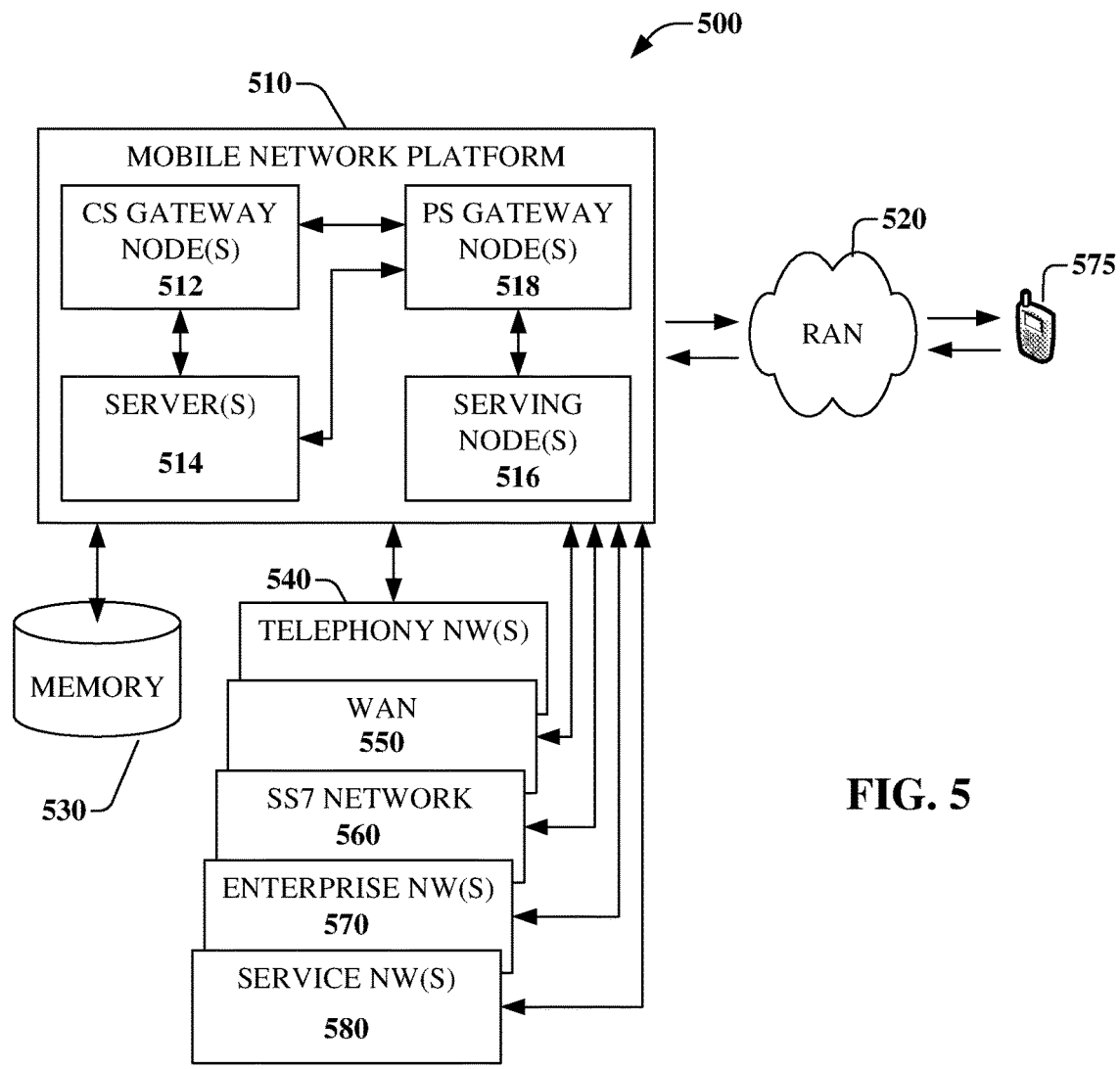
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WAN) 550, enterprise network(s) 570, and service network(s) 580, which can be embodied in local area network(s) (LANs), can also be interfaced with mobile network platform 510 through PS gateway node(s) 518. It is to be noted that WAN 550 and enterprise network(s) 570 can embody, at least in part, a service network(s) like IP multimedia subsystem (IMS). Based on radio technology layer(s) available in technology resource(s) of radio access network 520, PS gateway node(s)

518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
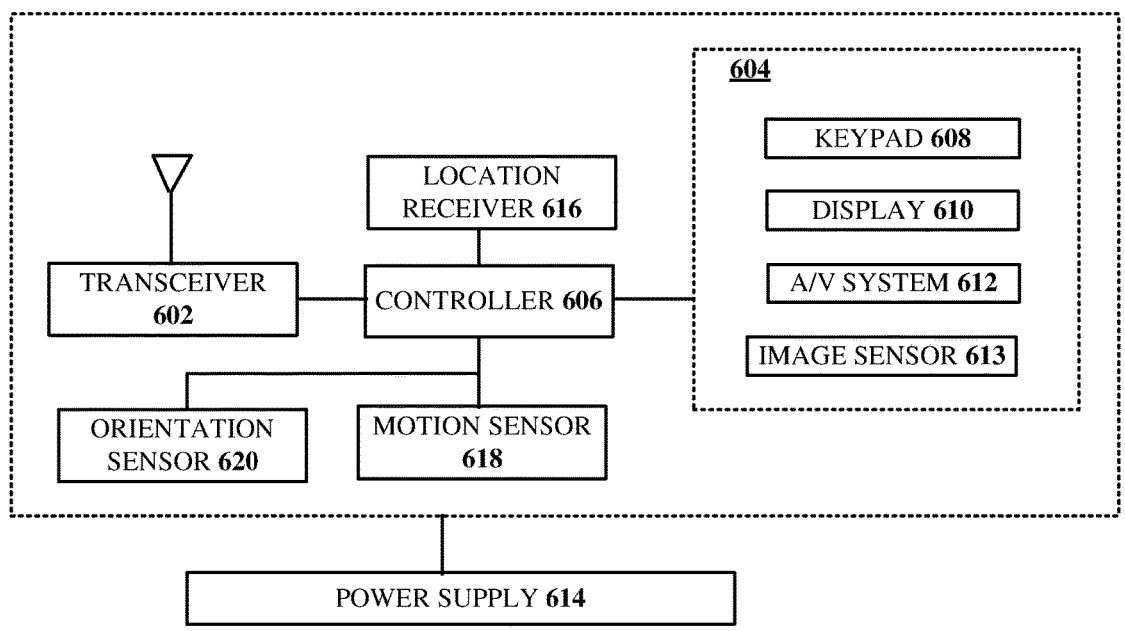
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method comprising:
   obtaining, by a processing system having a processor, media content;
   analyzing, by the processing system, the media content to discern a point of interest in the media content, wherein the analyzing results in scoring the point of interest in the media content;
   receiving, by the processing system, a request from equipment of a user to view the media content;
   obtaining, by the processing system, information about the user;
   identifying, by the processing system, a predicted field of view of the user based on the information about the user and the scoring the point of interest in the media content;
   sending, by the processing system, the predicted field of view to the equipment of the user;
   monitoring, by the processing system, a line of sight of the user based upon eye movements of the user;
   updating, by the processing system, the scoring of the point of interest in the media content based on the line of sight of the user; and
   updating, by the processing system, the predicted field of view of the user based on the line of sight of the user.

2. The method of claim 1, wherein the media content includes 360 degree video content.

3. The method of claim 2, wherein the sending the predicted field of view to the equipment of the user consists of sending only the predicted field of view.

4. The method of claim 3, wherein the sending the predicted field of view to the equipment of the user consists of sending less than 180 degrees of the media content centered on the predicted field of view.

5. The method of claim 3, wherein the sending the predicted field of view to the equipment of the user consists of sending less than 90 degrees of the media content centered on the predicted field of view.

6. The method of claim 1, further comprising sending, by the processing system to the equipment of the user, less than 135 degrees of the media content centered on the line of sight of the user.

7. The method of claim 1, further comprising aligning, by the processing system, a camera with the line of sight of the user and wherein the obtaining the media content further comprising obtaining the media content from the camera.

8. The method of claim 1, wherein the monitoring the line of sight comprises tracking the eye movements relative to an orientation of the user.

9. A non-transitory, machine-readable medium, comprising executable instructions that, when executed by a processing system including a processor, facilitate performance of operations, the operations comprising:
receiving video content from a 360 degree camera;
analyzing the video content to discern a point of interest in the video content, resulting in an analysis of the video content which identifies at least one potential point of interest;
receiving a first request from first equipment of a first user to view the video content;
receiving a second request from second equipment of a second user to view the video content;
obtaining first information about the first user;
obtaining second information about the second user;
identifying a predicted field of view based on the first information, the second information, and the analysis;
sending the predicted field of view to the first equipment and the second equipment;
monitoring a first line of sight of the first user based upon eye movements of the first user;
monitoring a second line of sight of the second user based upon eye movements of the second user;
updating the analysis based on the first line of sight and the second line of sight; and
updating the predicted field of view based on the first line of sight and the second line of sight.

10. The non-transitory, machine-readable medium of claim 9, wherein the sending the predicted field of view consists of sending only the predicted field of view.

11. The non-transitory, machine-readable medium of claim 10, wherein the sending the predicted field of view consists of sending less than 135 degrees of the video content centered on the predicted field of view.

12. The non-transitory, machine-readable medium of claim 9, the operations further comprising sending, to the first equipment, less than 135 degrees of the video content centered on the first line of sight.

13. The non-transitory, machine-readable medium of claim 9, the operations further comprising determining a midpoint between the first line of sight and the second line of sight and aligning the 360 degree camera with the midpoint.

14. The non-transitory, machine-readable medium of claim 9, the operations further comprising determining a midpoint between the first line of sight and the predicted field of view, and wherein the sending the predicted field of view comprises less than 180 degrees of the video content centered on the midpoint.

15. The non-transitory, machine-readable medium of claim 14, the operations further comprising aligning the 360 degree camera with the midpoint.

16. The non-transitory, machine-readable medium of claim 9, the operations further comprising determining a midpoint between the first line of sight, the second line of sight, and the predicted field of view, and wherein the sending the predicted field of view comprises less than 180 degrees of the video content centered on the midpoint.

17. The non-transitory, machine-readable medium of claim 16, the operations further comprising aligning the 360 degree camera with the midpoint.

18. An apparatus, comprising:
a processor; and
a memory that stores executable instructions that, when executed by the processor, facilitate performance of operations, comprising:
receiving video content from a 360 degree camera;
analyzing the video content to discern a point of interest in the video content, resulting in an analysis of the video content which identifies at least one potential point of interest;
receiving a request from equipment of a user to view the video content;
obtaining information about the user;
identifying a predicted field of view based on the information and the analysis;
sending less than 180 degrees of the video content centered on the predicted field of view to the equipment;
monitoring a line of sight of the user based upon eye movements of the user relative to an orientation of the user;
updating the analysis based on the line of sight; and
updating the predicted field of view based on the line of sight.

19. The apparatus of claim 18, the operations further comprising determining a midpoint between the line of sight and the predicted field of view, and wherein the sending the predicted field of view comprises less than 135 degrees of the video content centered on the midpoint.

20. The apparatus of claim 19, the operations further comprising aligning the 360 degree camera with the midpoint.

* * * * *